US007800279B2

(12) United States Patent
Yang

(10) Patent No.: US 7,800,279 B2
(45) Date of Patent: Sep. 21, 2010

(54) THERMO-BUCKLED MICRO ACTUATION UNIT MADE OF POLYMER OF HIGH THERMAL EXPANSION COEFFICIENT

(75) Inventor: Lung-Jieh Yang, Danshui Town (TW)

(73) Assignee: Tamkang University, Taipei County (TW)

( * ) Notice: Subject to any disclaimer, the term of this patent is extended or adjusted under 35 U.S.C. 154(b) by 695 days.

(21) Appl. No.: 11/653,212

(22) Filed: Jan. 16, 2007

(65) Prior Publication Data

US 2007/0171257 A1 Jul. 26, 2007

(30) Foreign Application Priority Data

Jan. 20, 2006 (TW) .............................. 95102347 A

(51) Int. Cl.
*H02N 10/00* (2006.01)

(52) U.S. Cl. ....................... 310/307; 310/306; 310/309; 310/311; 310/313 R; 60/527; 60/528; 417/410.1; 417/412; 417/413.1; 417/413.2

(58) Field of Classification Search ................. 310/306, 310/307, 308, 309, 310, 311, 313 R, 314, 310/315; 60/527, 528; 417/410.1, 412, 413.1, 417/413.2; *H02N 10/00*
See application file for complete search history.

(56) References Cited

U.S. PATENT DOCUMENTS

| | | | | |
|---|---|---|---|---|
| 3,946,398 | A * | 3/1976 | Kyser et al. | 310/332 |
| 5,816,780 | A * | 10/1998 | Bishop et al. | 417/322 |
| 6,071,087 | A * | 6/2000 | Jalink et al. | 417/322 |
| 6,386,507 | B2 * | 5/2002 | Dhuler et al. | 310/307 |
| 6,703,916 | B2 * | 3/2004 | Charvet et al. | 337/141 |
| 6,768,412 | B2 * | 7/2004 | Becka et al. | 337/36 |
| 6,812,820 | B1 * | 11/2004 | Fouillet | 337/333 |
| 7,011,228 | B2 * | 3/2006 | Ordiway | 220/287 |
| 7,011,288 | B1 * | 3/2006 | Slicker et al. | 251/11 |
| 2003/0214556 | A1 * | 11/2003 | Cabal et al. | 347/44 |
| 2004/0021398 | A1 * | 2/2004 | East | 310/311 |
| 2005/0046672 | A1 * | 3/2005 | Cabal et al. | 310/307 |
| 2005/0052496 | A1 * | 3/2005 | Delametter et al. | 310/307 |

* cited by examiner

*Primary Examiner*—Tran N. Nguyen
*Assistant Examiner*—Michael Andrews
(74) *Attorney, Agent, or Firm*—Rosenberg, Klein & Lee

(57) ABSTRACT

Disclosed is a thermo-buckled micro actuation unit made of parylene, which is a polymer having high thermal expansion coefficient, for delivering liquid from a source liquid section to a target liquid section, including a substrate on which a thermo-buckled micro actuation unit is formed. The thermo-buckled micro actuation unit includes upper and lower films made of polymers of high thermal expansion coefficient, a metal resistor arranged between the two films, and a flow channel defined between the lower film and the substrate. When electrical power is supplied to the metal resistor, the metal resistor generates heat and the heat is conducted to the upper and lower films, of which the thicknesses are different, whereby a temperature difference is induced therebetween and causing deformation of thermo-buckling, as a result of which the liquid is pumped from the source liquid section, through the flow channel, toward the target liquid section.

14 Claims, 9 Drawing Sheets

THERMO-BUCKLED MICRO ACTUATION UNIT MADE OF POLYMER OF HIGH THERMAL EXPANSION COEFFICIENT

FIELD OF THE INVENTION

The present invention relates to a micro actuation unit, and in particular to a thermo-buckled micro actuation unit made of polymers of high thermal expansion coefficient.

BACKGROUND OF THE INVENTION

In the microfluidic field of micro-electro-mechanical systems (MEMS), two types of conventional actuators are known. An actuator of the first type uses electro-chemicals or induced electric fields to drive or separate liquid and the feature is immovability of elements thereof, such as fixed electrodes, which operates by applying electrical potential to induce an electrical field for realizing driving or separation of liquid without employment of movable parts. Examples include electrophoretic actuation unit and dielectrophoretic actuation unit. An actuator of the second type is operated by using electro-mechanical moving parts to drive liquid, such as a piezoelectric device that makes use of mechanical elements thereof to drive liquid, the feature of which resides on movability of elements thereof. Integrated design and manufacturing of the above MEMS actuation units are of vital importance for protein chips, micro-fluidic systems or lab-on-a-chips of the biomedical field.

By the first driving way of electro-chemicals or induced electric field, the electrophoretic actuation or dielectrophoretic actuation is operated with alternating current power and requires electrical voltage as high as several hundreds or even over one thousand volts. These make them not suitable for applications of biomedical systems that are implanted in human body or are arranged very close to human body. On the other hand, the second driving way using, e.g., the piezoelectric materials, allows manufacturing by bonding blocks of piezoelectric material and other parts together. However, the piezoelectric device has a bulky size, which cannot be easily reduced. The piezoelectric device can also be manufactured by thin film growth method, which, however, suffers process incompatibility and as a consequence, the piezoelectric driving and manufacturing process thereof cannot be easily integrated with the newly-developed biomedical systems that are arranged close to human body. In other words, (electric) field-based or piezoelectrics-based driving mechanisms are subject to severe limitation in the applications of biomedical micro-fluidic systems, and new electro-thermal actuation principles as well as their applicable devices are required accordingly.

As to electro-thermal driving, it originates from the idea of thermo-buckled actuation. With proper layout designs of heating resistors, electrical power accompanying application of electrical voltage or current can be consumed at portions that have great electrical resistances, and the portions are heated up. When the heating causes the structures adjacent to the portions with a large buckling deformation, realistic actuation can be affected by this deformation consequently. A micro actuation unit making use of such a phenomenon is referred to a thermo-buckled micro actuation unit.

The earliest thermo-buckled micro actuation unit made of metal was made by LIGA technology. Silicon-based material is later employed to eliminate the limitation of rare and expensive synchrotron X-ray sources. Special configuration of the heated surfaces is thus realized so that the silicon-based thermo-buckled micro actuation unit proved to have up-and-down movement in an uni-directional way. The conventional thermo-buckled devices just as mentioned above, made of metal or polysilicon, have a very high operation temperature of at least 400° C. Thus, the thermal driving device is often used in optical MEMS applications, for the high temperature induced during the operation of the thermo-buckled device does not seriously affect the normal operation of the optical devices. However, these conventional thermal driving devices are not suitable for biomedical applications due to the high operation temperature thereof.

SUMMARY OF THE INVENTION

Thus, the present invention is aimed to provide a thermo-buckled micro actuation unit made of polymers of high thermal expansion coefficient, which has excellent biomedical compatibility, miniaturized size of less than 1 mm, low driving voltage of less than 10 volts, and low operation temperature of less than 100° C.

The present invention is made to overcome the problem of high operation temperature of the conventional thermo-buckled driving unit by using polymers, such as parylene in the design and manufacturing of thermo-buckled micro actuation unit or micro-pump. Parylene features excellent thermal insulation and electrical insulation and has a thermal expansion coefficient higher than regular metals with one order of magnitude. Thus, a thermo-buckled micro actuation unit made of parylene has an operation temperature as low as 40-60° C., which is lower than the operation temperature of the conventional metal based or polysilicon based micro actuation units with one order of magnitude. In addition, parylene features excellent biomedical compatibility and low processing temperature.

The present inventor has done thermal deformation analysis with finite element method analysis software ANSYS for simulating the deformation of a parylene circular film subjecting to heating to provide data for design of parylene thermo-buckled actuation unit of the present invention. The simulation result reveals that a temperature rise of 10-40 degrees is sufficient to make the parylene circular film generating micrometer level displacement and deformation in a vertical direction.

The present inventor further employs low temperature surface micromachining to make a thermo-buckled micro actuation unit having a sandwich structure on a substrate, in which a platinum resistor is in the middle and interposed between upper and lower vibration films made of parylene of different thicknesses, with the substrate made of silicon, the vibration films made of parylene, and the platinum resistor serving as a heating source for the actuation unit.

Compared to the conventional technology, the thermo-buckled micro actuation unit made of polymers of high thermal expansion coefficient in accordance with the present invention features low power consumption and low driving voltage, control of system temperature below 60 degrees, characteristic dimension being limited within the order of hundreds of micrometer, electrical insulation and excellent thermal insulation, excellent biomedical compatibility, and processing temperature being lower than 100° C.

With respect to the low power consumption and low driving voltage, since the future bio-MEMS inspection systems will be portable, body-close, and even body-implanted, and will be integrated with wireless transmission for transmission of biomedical signals, the power supply for the micro systems must be stable and have a long service life, or alternatively a self-powering system or light-weighted Lithium cell of sufficient current density. In other words, the overall power consumption for blood sampling, separation, inspection, driving, and wireless signal transmission of a biomedical inspection system must be subject to the limitation of total capacity of the power supply and the supplied voltage must be of standardized specification. The low power consumption, which is less than about 100 mW, and low driving voltage, which is lower than 5 V, of the micro-pump of the present invention will satisfy the needs of most advanced micro biomedical inspection systems.

To meet the requirement of temperature limitation for biomedical liquids, the temperature of the micro systems must be limited to no higher than 60° C. Generally speaking, when temperature of the biomedical environment exceeds 60° C., DNA or protein contained in the liquid to be inspected will denature. The thermo-buckled operation of the present invention, together with the use of parylene, makes the present invention suitable for the low operation temperature requirement.

With respect to the characteristic dimension being limited in the order of several hundreds of micrometer, some micro biomedical inspection systems, such as intravenous catheter systems, have an internal diameter of less than 500 μm. Such a dimension in the range of hundreds of micrometer is very limited for the installation of micro flow channels and micro liquid driving pumps, while allowing the extension of conductive wiring. The characteristic dimension of the vibration film in accordance with the present invention is as small as hundreds of micrometers, which is much smaller than that of micro-pump manufactured with other technologies. Thus, integration of the present invention with micro biomedical inspection system can be facilitated.

As to the property of electrical insulation and high thermal insulation, the material of parylene used to make the liquid driving device in accordance with the present invention allows for arrangement of micromachining mask pattern in a very limited space for multi-signal wiring and three-dimensional jumper. Further, parylene has an excellent thermal insulation property, and thus can provide a sufficient thermal gradient for conducting waste heat generated in the operation of liquid driving into the isothermal heat sink of human body that maintains 37° C., while being sufficient to provide power for driving operation, which prevents the liquid driving device from not being able to drive liquid due to being maintained in an environment in which the temperature does not exceeds an upper bound of 60° C. and the driving power just corresponds to the waste heat.

In biomedical compatibility, a biomedical inspection device, whether being put inside a human body or arranged outside the human body to contact the body liquid for inspecting the ingredients of the body liquid, must be human body compatible, where material for making the biomedical inspection device or residuals of manufacturing process must not be toxicant to the human body. Another consideration is whether the human body will induce immunity against the foreign objects of the biomedical inspection devices and whether thrombus will be caused to enclose the inspection devices thereby making the device fail to function. With respect to the compatibility issue, the material of parylene used in the present invention has better biomedical compatibility than the conventionally used silicon-based material With respect to the issue of processing temperature being less than 100° C., the manufacturing of the biomedical inspection devices made of parylene in accordance with the present invention can be done with low environment temperature of processing. This makes it possible to protect the polymer material and the micro-structure from being damaged by high temperature and prevents residual thermal stress in heterogeneous materials or large thermo-buckling deformation induced in homogeneous materials.

BRIEF DESCRIPTION OF THE DRAWINGS

The present invention will be apparent to those skilled in the art by reading the following description of preferred embodiment thereof, with reference to the attached drawings, in which.

DETAILED DESCRIPTION OF THE PREFERRED EMBODIMENT

Figure 1:
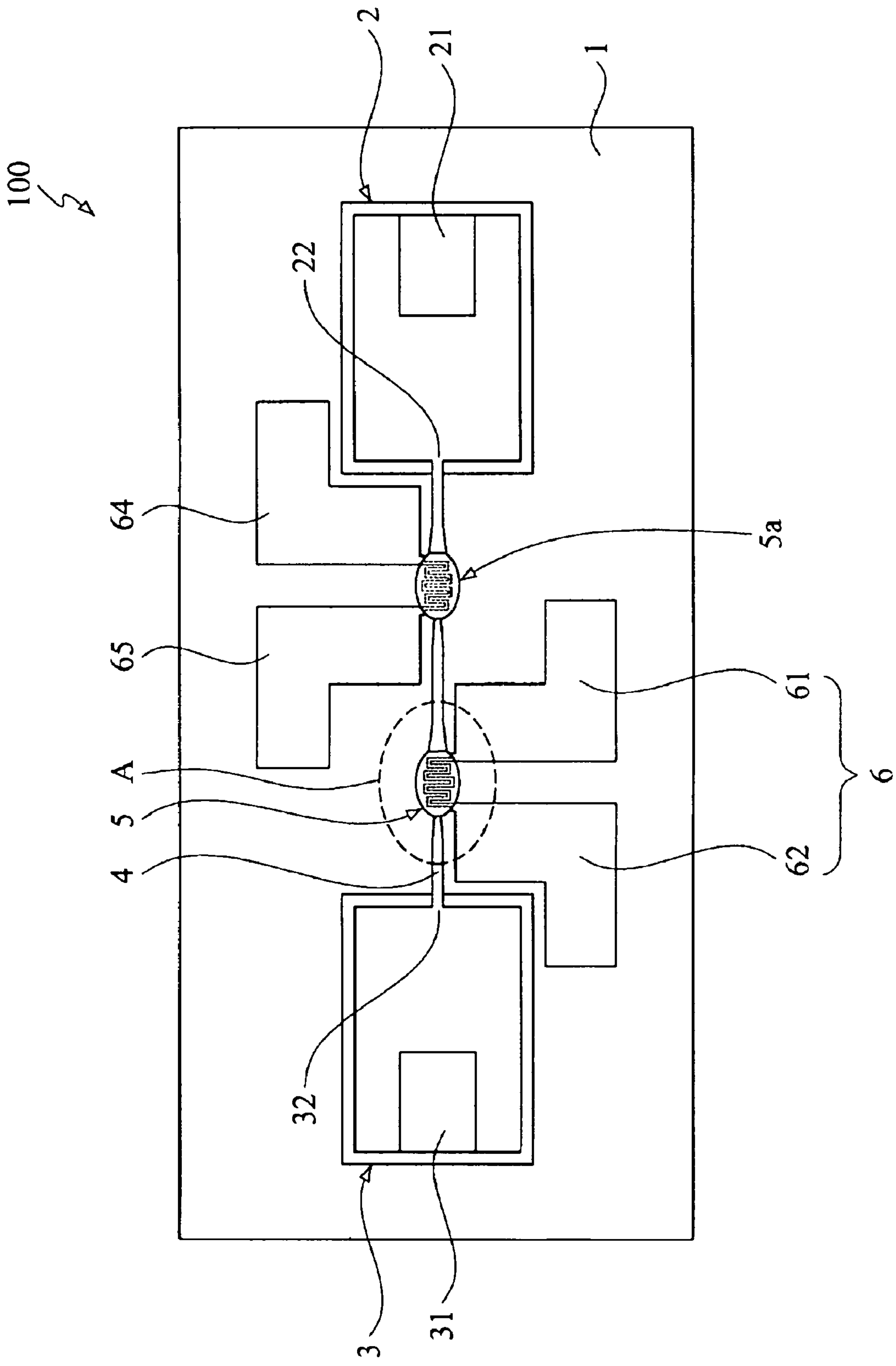
FIG. 1 is a top view of a first embodiment of a micro-pump device comprising a thermo-buckled micro actuation unit made of high thermal expansion coefficient polymers in accordance with the present invention.

With reference to the drawings and in particular to FIG. 1, a first embodiment of a thermo-buckled micro-pump device made of parylene in accordance with the present invention, generally designated with reference numeral 100, is shown. The thermo-buckled micro-pump device 100 of the present invention comprises a substrate 1, a source liquid section 2, a target liquid section 3, a flow channel 4, at least one thermo-buckled micro actuation unit 5, and a conductive unit 6. The source liquid section 2 comprises a source liquid section window 21 and a channel entrance 22. The target liquid section 3 comprises a target liquid section window 31 and a channel exit 32. The conductive unit 6 comprises a first electrode 61 and a second electrode 62.

The thermo-buckled micro-pump device 100 functions to deliver liquid from the source liquid section 2, through the flow channel 4, to the target liquid section 3. The liquid is replenished through the source liquid section window 21, and flows, in sequence, through the channel entrance 22, the flow channel 4, the thermo-buckled micro-actuation unit 5 arranged in the flow channel 4, and the channel exit 32, to the target liquid section 3.

Figure 2:
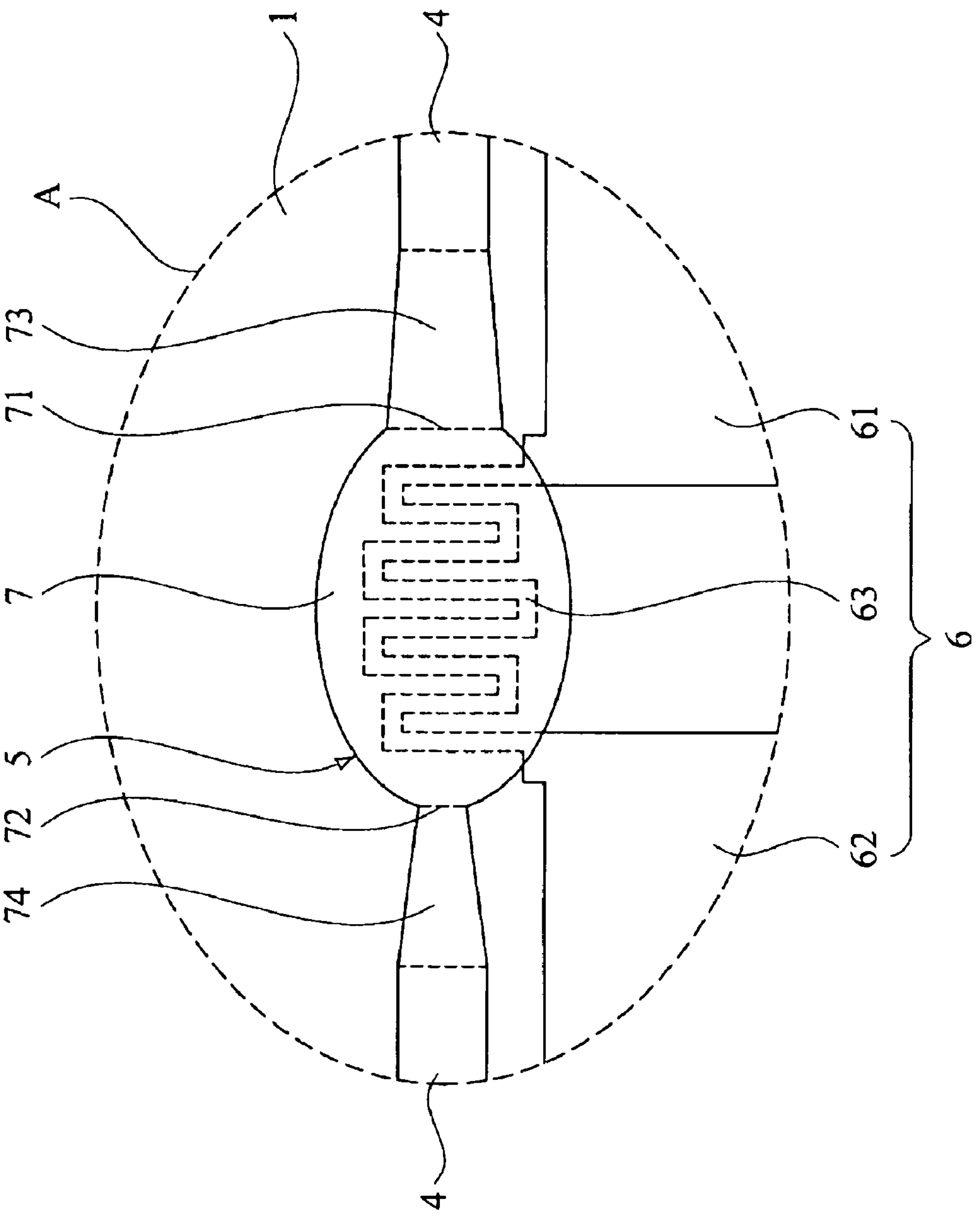
FIG. 2 is an enlarged top view of the encircled portion A of FIG. 1.

Also referring to FIG. 2, which is an enlarged top view of the encircled portion A of FIG. 1, the thermo-buckled micro actuation unit 5 comprises an electrical resistor 63, which is electrically connected to the first electrode 61 and the second electrode 62. A micro actuation unit cavity 7 is defined between the thermo-buckled micro actuation unit 5 and the substrate 1. The micro actuation unit cavity 7 has a cavity entrance 71 and a cavity exit 72. The cavity entrance 71 is in fluid communication with the flow channel 4 with a diverging structure 73 connected therebetween. The diverging structure 73 has a width that is gradually increased from the flow channel 4 to the cavity entrance 71. The cavity exit 72 is in fluid communication with the flow channel 4 with a diverging structure 74 connected therebetween. The diverging structure 74 has a width that is gradually increased from the cavity exit 72 to the flow channel 4.

The thermo-buckled micro actuation unit 5 is arranged in a predetermined portion of the flow channel 4. In other words, both the flow channel 4 and the thermo-buckled micro actuation unit 5 are formed on the substrate 1. Liquid flowing along a first portion of the flow channel 4 moves, in sequence, through the cavity entrance 71, the micro actuation unit cavity 7, the cavity exit 72, and then continues along another portion of the flow channel 4.

Figure 3:
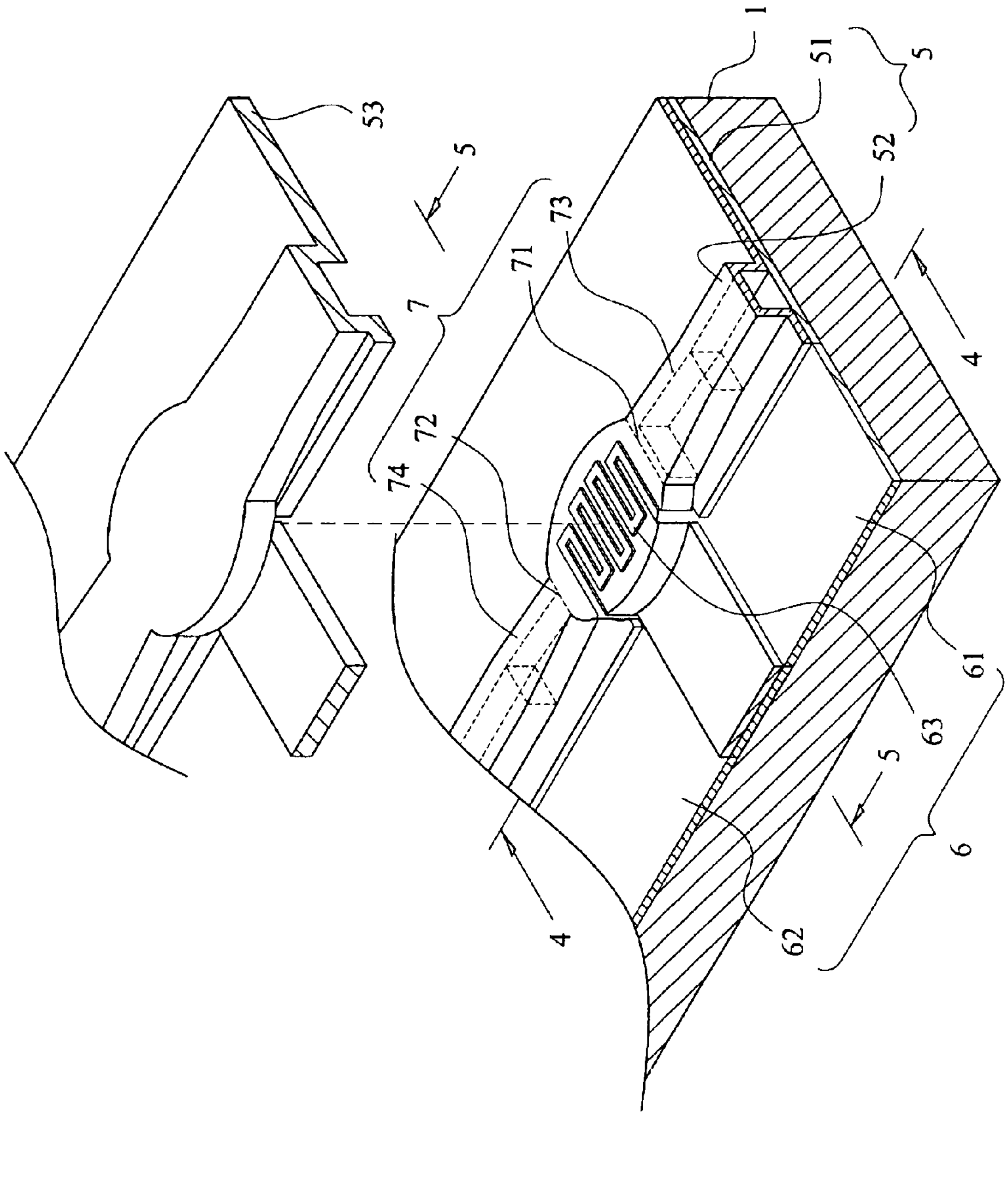
FIG. 3 is a perspective view of the thermo-buckled micro actuation unit made of high thermal expansion coefficient polymers in accordance with the present invention.

Also referring to FIG. 3, which shows a perspective view of the thermo-buckled micro actuation unit made of polymers of high thermal expansion coefficient in accordance with the present invention, the thermo-buckled micro actuation unit 5 comprises a buffering layer 51, a lower film 52, and an upper film 53. The buffering layer 51 is formed on the substrate 1. The lower film 52 is formed on the buffering layer 51 and surrounds the flow channel 4 and the micro actuation unit cavity 7. The electrical resistor 63 is formed on a top surface of the lower film 52, while the upper film 53 covers the lower film 52 and the electrical resistor 63. The first electrode 61 and the second electrode 62 are directly formed on the substrate 1, functioning to electrically connect the electrical resistor 63 to an external power source.

Figure 4:
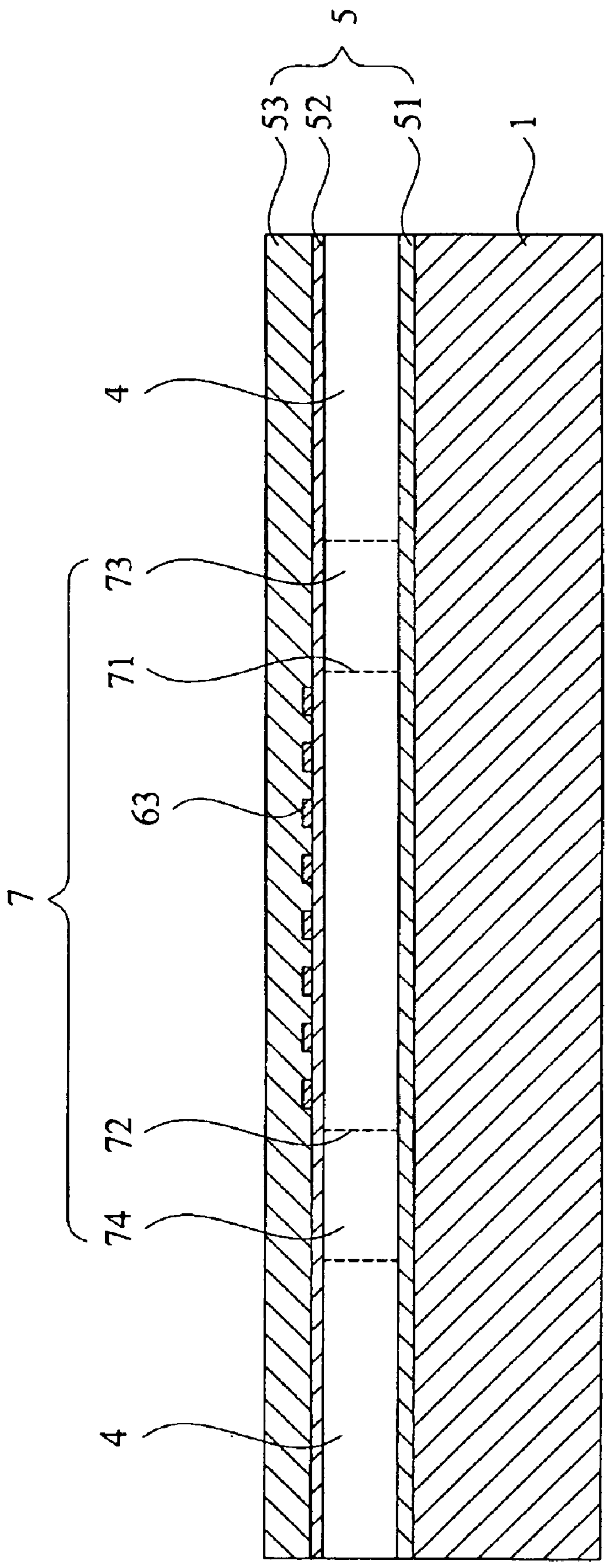
FIG. 4 is a cross-sectional view taken along line 4-4 of FIG. 3.

Also referring to FIG. 4, which is a cross-sectional view taken along line 4-4 of FIG. 3, as shown in the drawing, firstly the buffering layer 51 is formed on the substrate 1; the flow channel 4 and the micro actuation unit cavity 7 that are surrounded by the lower film 52 are arranged on the buffering layer 51; the lower film 52 is arranged above the flow channel 4 and the micro actuation unit cavity 7; the electrical resistor 63 is provided on the lower film 52; and the upper film 53 covers the lower film 52 and the electrical resistor 63. The cavity entrance 71 of the micro actuation unit cavity 7 is connected to the flow channel 4 through the diverging structure 73, and the cavity exit 72 is connected to the flow channel 4 through the diverging structure 74.

Figure 5:
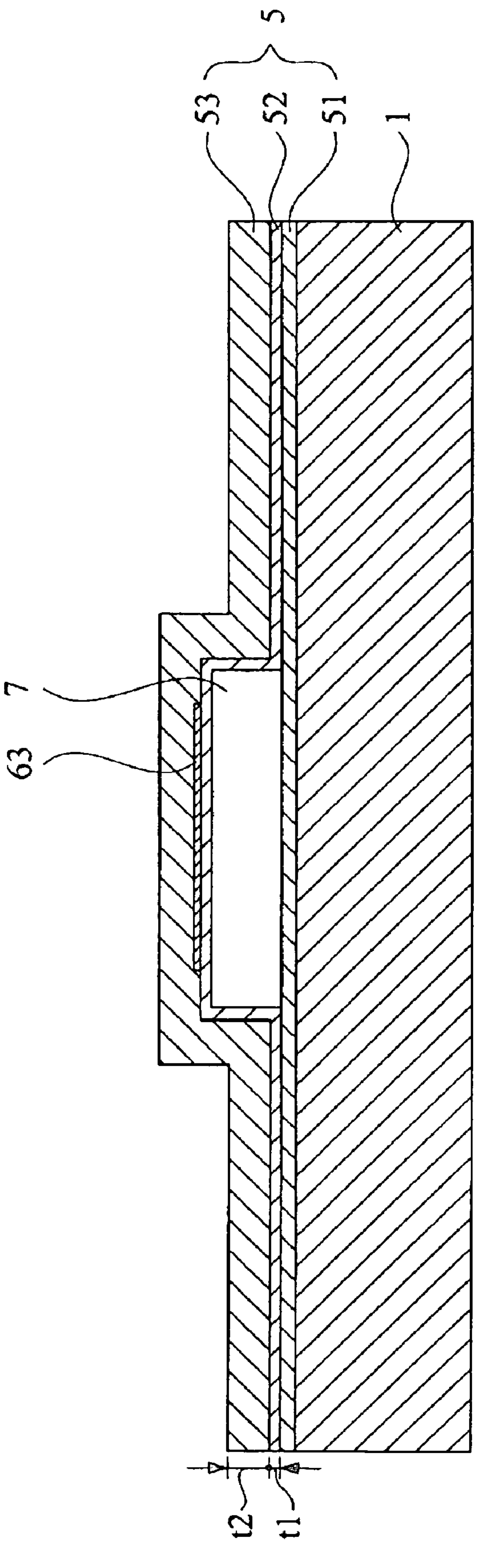
FIG. 5 is a cross-sectional view taken along line 5-5 of FIG. 3.

Also referring to FIG. 5, which shows a cross-sectional view taken along line 5-5 of FIG. 3, as shown in the drawing, the electrical resistor 63 is arranged between the upper film 53 and the lower film 52 and the lower film 52 surrounds the micro actuation unit cavity 7.

The operation of the parylene thermo-buckled micro-pump device 100 in accordance with the present invention will be described. As shown in FIGS. 4 and 5, the lower film 52 has a first thickness t1, while the upper film 53 has a thickness t2. When electrical power from the external power source is supplied through the first electrode 61 and the second electrode 62 to the electrical resistor 63, the electrical resistor 63 generates heat and temperature rises. The heat from the electrical resistor 63 is conducted to and heats the lower film 52 and the upper film 53 that are in physical contact with the electrical resistor 63.

Since the first thickness t1 of the lower film 52 is different from the second thickness t2 of the upper film 53, the lower film 52 and the upper film 53 are made of different amounts of material for absorbing heat. In the embodiment illustrated, the lower film 52 has less material for absorbing heat, while the upper film 53 has more material for absorbing heat. If the amount of heat conducted in both upward and downward directions from the resistor 63 is assumed to be substantially identical, the lower film 52 and the upper film 53 are subject to different levels of temperature rise. That is, the lower film 52 has a high temperature rise, while the upper film 53 has a low temperature rise, whereby the temperature of the upper film 53 is comparatively lower than that of the lower film 52.

Figure 6:
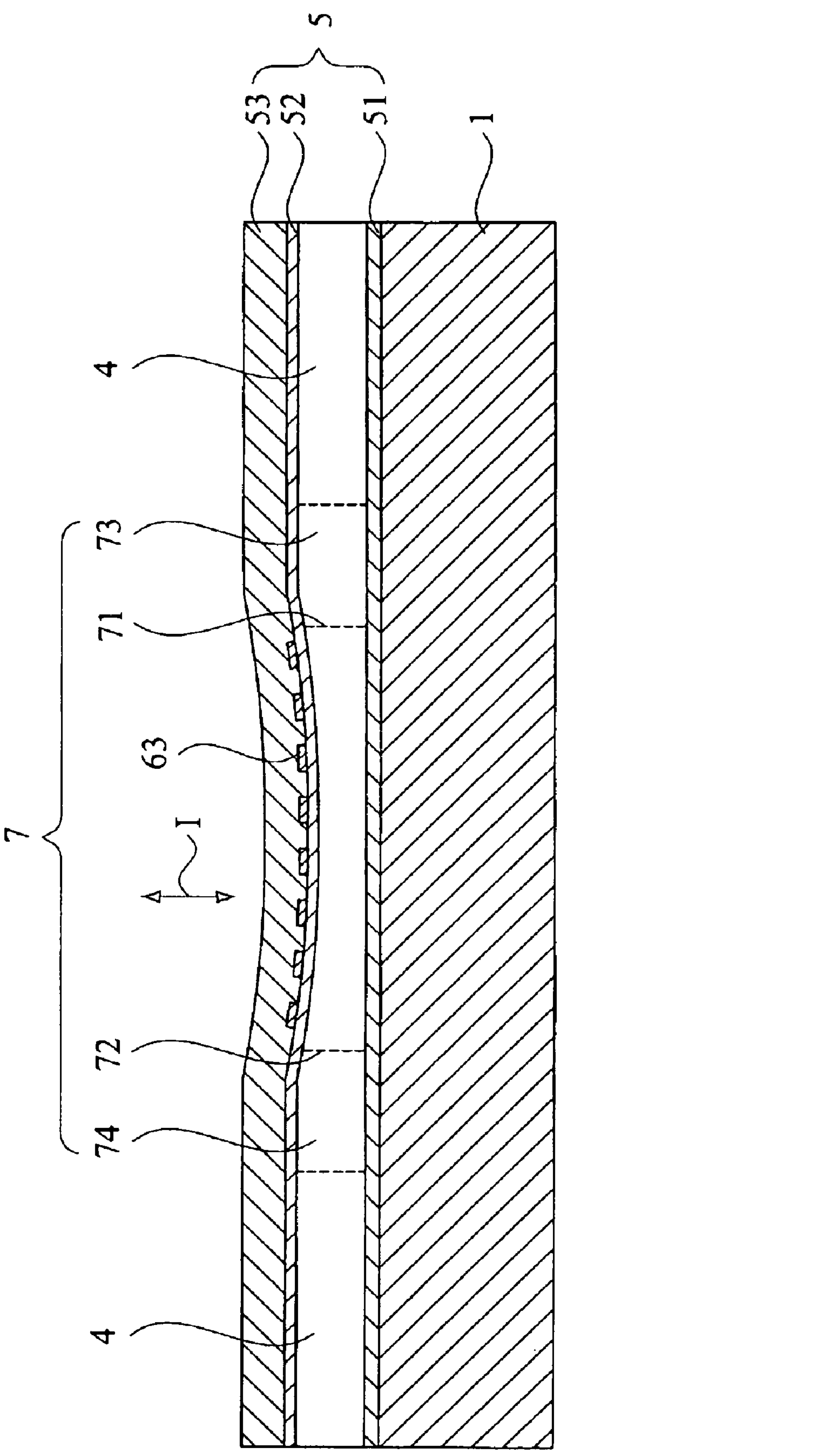
FIG. 6 is similar to FIG. 4 but showing the condition after power is supplied to a conductive unit of the thermo-buckled micro actuation unit in accordance with the present invention.

Also referring to FIG. 6, which is similar to FIG. 4 but shows the situation after electrical power is supplied to the conductive unit 6, since the lower film 52 has a higher temperature than that of the upper film 53 when electrical power is supplied to the electrical resistor 63, the lower film 52 and the upper film 53 exhibit different degrees of thermal expansion. In the embodiment illustrated, the degree of thermal expansion of the lower film 52 is larger than that of the upper film 53, which causes deformation of the thermo-buckled micro actuation unit 5 as illustrated in FIG. 6.

When the electrical power supplied through the first electrode 61 and the second electrode 62 is cut off, the lower film 52 and the upper film 53 get cooled down back to their original temperatures and the thermo-buckled micro actuation unit 5 restores to its original configuration as shown in FIG. 4. To summarize, when electrical power is supplied to the first electrode 61 and the second electrode 62, the thermo-buckled micro actuation unit 5 is transformed to the deformed configuration shown in FIG. 6, and when the electrical power supplied to the first electrode 61 and the second electrode 62 is cut off, the thermo-buckled micro actuation unit 5 resumes the original configuration shown in FIG. 4. Cyclically providing and cutting off power supply thus causes repeated deformation of the thermo-buckled micro actuation unit 5 in the vertical direction, which in turn induces vibration of the thermo-buckled micro actuation unit 5 along a vertical direction I as shown in FIG. 6.

When the thermo-buckled micro actuation unit 5 is deformed as illustrated in FIG. 6, the micro actuation unit cavity 7 delimited between the lower film 52 and the buffering layer 51 is compressed, whereby the liquid contained in the micro actuation unit cavity 7 is subject to compression and is forced to flow into the cavity entrance 71 and the cavity exit 72.

As shown in FIG. 2, since the width of the diverging structure 73 between the cavity entrance 71 and the flow channel 4 is increased from the flow channel 4 to the cavity entrance 71, and since the width of the diverging structure 74 between the cavity exit 72 and the flow channel 4 is increased from the cavity exit 72 to the flow channel 4, when the micro actuation unit cavity 7 is subject to compression caused by the vibration of the thermo-buckled micro actuation unit 5, the amounts of liquid that are driven by the compression into the cavity entrance 71 and the cavity exit 72 respectively are different. In the embodiment illustrated, the amount of liquid driven into the cavity entrance 71 is less, while the amount of liquid driven into the cavity exit 72 is more, whereby the net flow of the liquid contained in the flow channel 4 and the micro actuation unit cavity 7 caused by the compression of the micro actuation unit cavity 7 induced by the vibration of the thermo-buckled micro actuation unit 5 is in the direction from the cavity entrance 71 toward the cavity exit 72.

To conclude, as shown in FIG. 1, when electrical power is supplied to the first electrode 61 and the second electrode 62 of the thermo-buckled micro-pump device 100, the liquid replenished through the source liquid section window 21 flows through the channel entrance 22 into the flow channel 4 and moves along the flow channel 4 to pass through the thermo-buckled micro actuation unit 5 and further flows through the channel exit 32 of the target liquid section 3 to eventually discharge through the target liquid section window 31. As such, the liquid is delivered from the source liquid section 2 toward the target liquid section 3. In the application, a single thermo-buckled micro actuation unit 5 and two electrodes 61, 62 are arranged in the flow channel 4. In other applications, two or more thermo-buckled micro actuation unit 5 and a plurality of pairs of electrodes in accordance to the number of the thermo-buckled micro actuation units 5, 5*a* may be arranged in the flow channel 4. Take for an example. Two thermo-buckled micro actuation unit 5 and four electrodes (61, 62, 64, 65) may be arranged.

Figure 7:
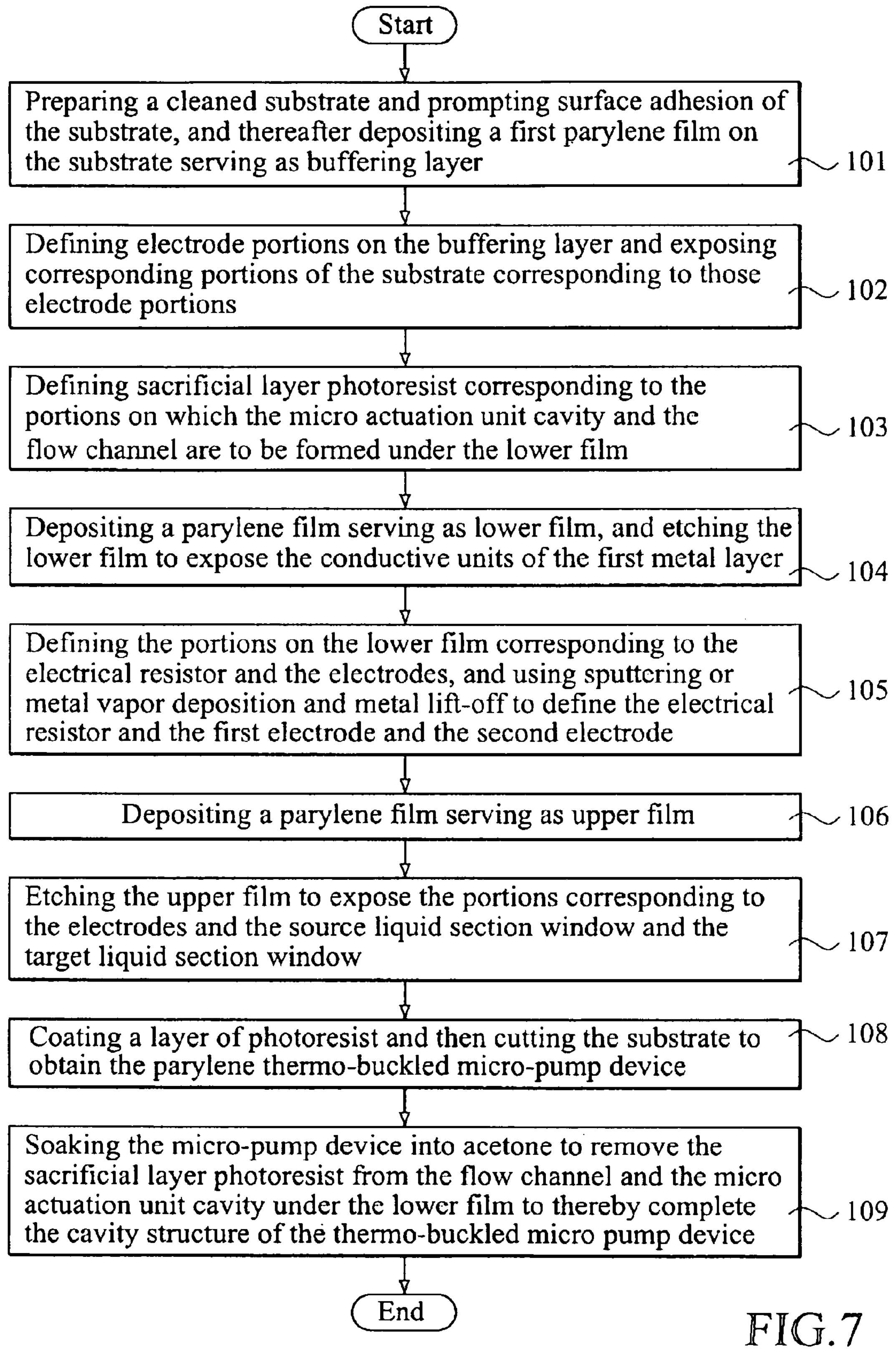
FIG. 7 is a flow chart of a manufacturing process of the micro-pump device comprising the thermo-buckled micro actuation unit made of high thermal expansion coefficient polymers in accordance with the present invention.

FIG. 7 shows a process for manufacturing the micro-pump device comprised of the thermo-buckled micro actuation unit made of polymers of high thermal expansion coefficient in accordance with the present invention. The present invention discloses a process for manufacturing the parylene thermo-buckled micro actuation unit 5, which will be described as follows.

The process for manufacturing the parylene thermo-buckled micro actuation unit 5 in accordance with the present invention comprises a cleaning step wherein the substrate 1 is cleaned with Piranha solution made of sulfuric acid and hydrogen peroxide, followed by impregnation in A-174 adhesion promoter for prompting surface adhesion of the substrate, and thereafter, a parylene film of 1 μm thickness, which will serve as the buffering layer 51, is deposited on a working surface of the substrate 1 (step 101). The buffering layer 51 is then coated with photoresist, and a first mask is used to define portions for forming the electrodes 61, 62 and etching is performed on the buffering layer 51 with oxygen plasma obtained with a reactive ion etcher (RIE) to expose portions of the substrate 1 corresponding to those portions of the conductive units 6 (step 102).

The next step of the process is to coat photoresist on the buffering layer 51 and using a second mask to define sacrificial layer photoresist corresponding to the portions on which the micro actuation unit cavity 7 and the flow channel 4 are to be formed under the lower film 52 (step 103).

The next step of the process is to deposit a parylene film of first thickness t1, which will then serve as the lower film 52, followed by coating photoresist on the lower film 52 and using the first mask to define the conductive units 6 and thereafter, using the oxygen plasma of the reactive ion etcher to etch the lower film 52 to expose the conductive units 6 of the first metal layer (step 104).

The next step of the process is to coat photoresist and using a third mask to define the portions on the lower film 52 corresponding to the electrical resistor 63 and the electrodes, such as the first electrode 61 and the second electrode 62, followed by sputtering or metal vapor deposition and metal lift-off to define the electrical resistor 63 and the first electrode 61 and the second electrode 62 (step 105).

The next step of the process is to deposit a parylene film of second thickness t2, which serves as the upper film (step 106). A fourth mask is then used to define the conductive units 6 and the source liquid section window 21 and the target liquid section window 31, followed by using the oxygen plasma of the reactive ion etcher to etch the upper film 53 to expose the portions corresponding to the electrodes 61, 62, and the source liquid section window 21 and the target liquid section window 31 (step 107).

The next step of the process is to coat a layer of photoresist for protecting the device from being contaminated by devices occurring in cutting operation and then cutting the substrate 1 to obtain the parylene thermo-buckled micro-pump device 100 (step 108). The final step of the process is to soak the micro-pump chip 100 into acetone to remove the sacrificial layer photoresist from the flow channel 4 and the micro actuation unit cavity 7 under the lower film 52 by following the source liquid section window 21, the flow channel 4, and the target liquid section window 31 to thereby complete the cavity structure of the thermo-buckled micro-pump device (step 109).

Figure 8:
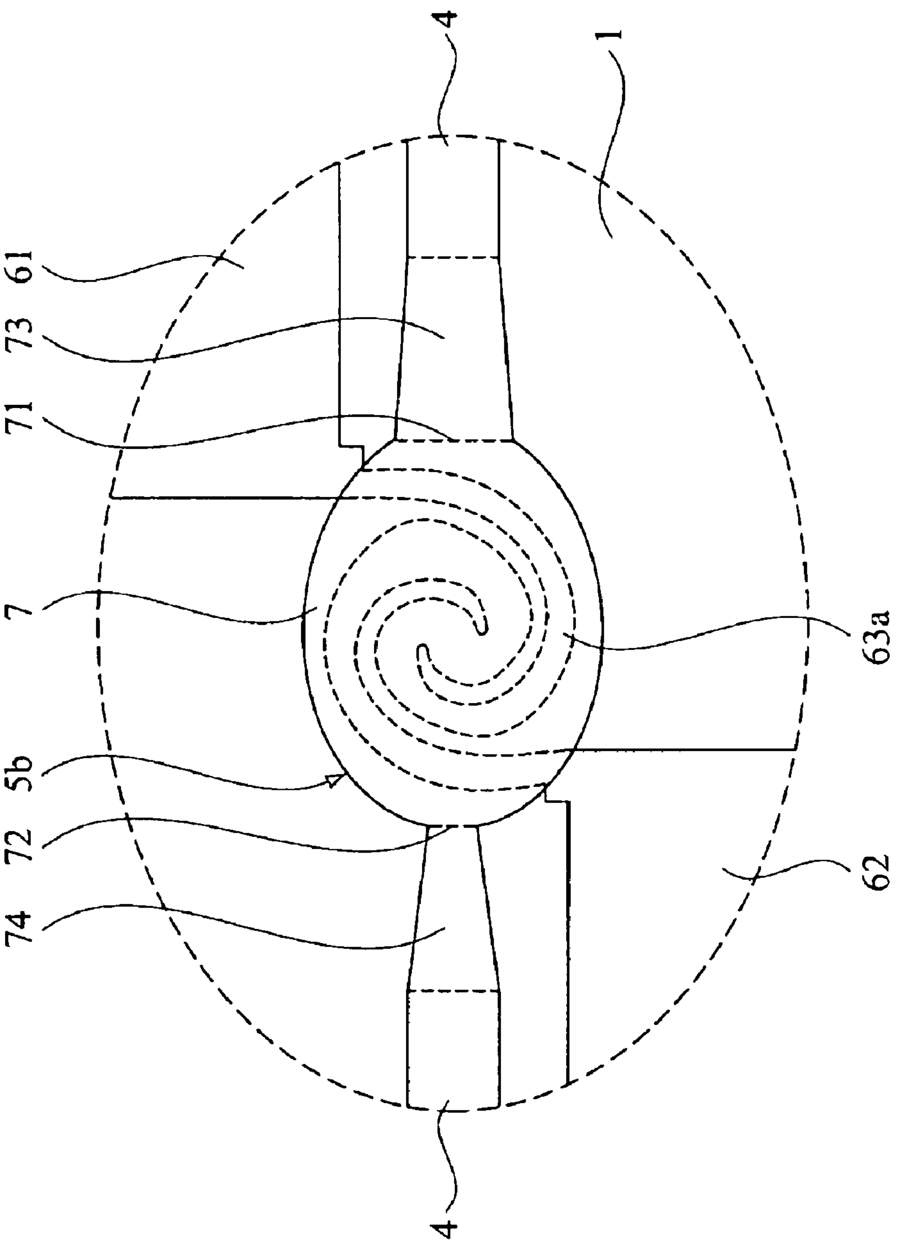
FIG. 8 is an enlarged top view showing a second embodiment of the thermo-buckled micro actuation unit made of high thermal expansion coefficient polymers in accordance with the present invention, in which a spiral form resistor is arranged.

In the first embodiment, the resistor 63 of the thermo-buckled micro-pump device is of winding form. The resistor 63 may be of any shapes, forms or configurations. FIG. 8 is an enlarged top view showing a second embodiment of the thermo-buckled micro actuation unit made of high thermal expansion coefficient polymers in accordance with the present invention. As shown in FIG. 8, the resistor 63*a* is of spiral form. Such a configuration enables the resistor 63*a* to uniformly distribute heat to the surrounding.

Figure 9:
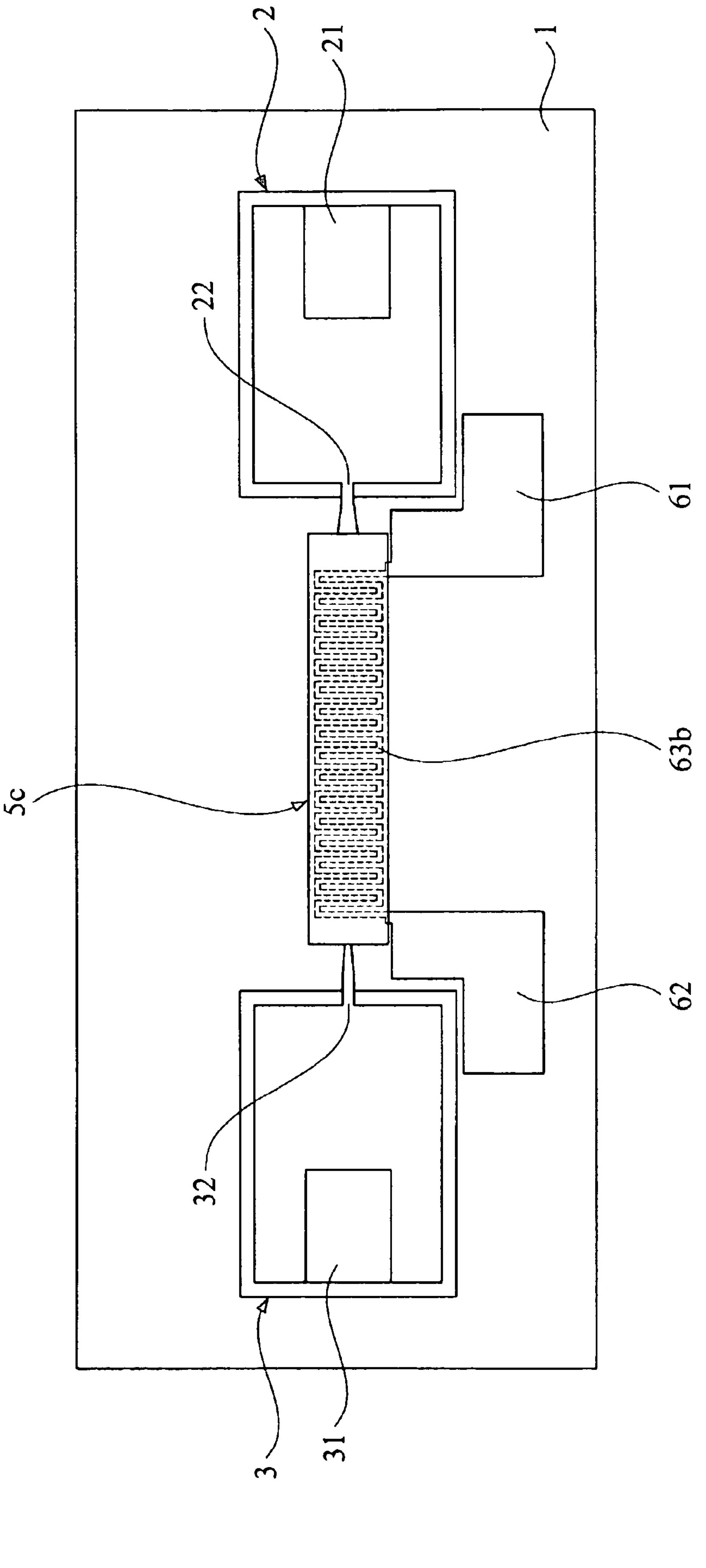
FIG. 9 is a schematic view showing a second embodiment of the micro-pump device comprising the thermo-buckled micro actuation unit in accordance with the present invention, in which a long dimension of thermo-buckled micro actuation unit is arranged between the source liquid section and the target liquid section.

It can be seen from FIG. 1 that two thermo-buckled micro actuation units 5, 5*a* and four electrodes, namely, the first electrode 61, the second electrode 62, the third electrode 64 and the fourth electrode 65, are arranged. In application, the arrangement of the thermo-buckled micro actuation unit and electrodes can be varied or modified to meet different requirements. As shown in FIG. 9, a schematic view of a second embodiment of the micro-pump device comprising the thermo-buckled micro actuation unit, a single thermo-buckled micro actuation unit 5*c* of long dimension is arranged between the source liquid section 2 and the target liquid section 3, and a first electrode 61 and a second electrode 62 are provided. The flow channel may be shortened, eliminated or modified, and the thermo-buckled micro-pump device comprising such a structure is still able to provide the vibration functions and features of the present invention.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A thermo-buckled micro actuation unit, comprising:

a lower film formed on a substrate and made of parylene having a high thermal expansion coefficient, said lower film having a first thickness, the lower film extending over the substrate to enclose a micro actuation unit cavity therebeneath, the micro actuation unit cavity having a cavity entrance and a cavity exit configured to maintain a fluid flow through the micro actuation unit cavity in a direction laterally between the lower film and substrate;

an upper film made of parylene having the high thermal expansion coefficient, said upper film being arranged on the lower film and having a second thickness, the second thickness being different from the first thickness; and an electrical resistor layer of a predetermined configuration formed between the lower film and the upper film, said electrical resistor layer being located above and in correspondence with the micro actuation unit cavity;

wherein, when an electrical power is supplied to the electrical resistor layer, the electrical resistor layer generates heat, said generated heat inducing a temperature difference between the upper film and the lower film, thereby resulting in thermo-buckled deformation of the upper film and the lower film to actuate the fluid flow in the direction laterally between the lower film and substrate.

2. The thermo-buckled micro actuation unit as claimed in claim 1, wherein the thermo-buckled micro actuation unit comprises a buffering layer arranged between the lower film and the substrate, said buffering layer serving to enhance attachment between the thermo-buckled micro actuation unit and the substrate.

3. A thermo-buckled micro-pump device for delivering liquid from a source liquid section to a target liquid section, the thermo-buckled micro-pump device comprising:

a flow channel having first and second ends, each of said first and second ends being connected to the source liquid section and the target liquid section, respectively;

a substrate;

a lower film made of a material of high thermal expansion coefficient, said lower film having a first thickness and being formed on the substrate, the lower film extending over the substrate to enclose a micro actuation unit cavity therebeneath, wherein the micro actuation unit cavity has a cavity entrance and a cavity exit for connecting the micro actuation unit cavity to the flow channel, said cavity entrance being connected to said flow channel through a first diverging structure, and said cavity exit being connected to said flow channel through a second diverging structure, wherein said first diverging structure has a respective width thereof increasing from said flow channel at said first end thereof to said cavity entrance, and wherein said second diverging structure has a respective width thereof increasing from said cavity exit to said flow channel at said second end thereof, thereby maintaining a flow of said liquid from said source liquid section to said target liquid section through the micro actuation unit cavity in a direction laterally between the lower film and substrate;

an upper film made of a material of high thermal expansion coefficient, said upper film being arranged on the lower film and having a second thickness, the second thickness being different from the first thickness; and an electrical resistor layer of a predetermined configuration formed between the lower film and the upper film, said electrical resistor layer being located above and in correspondence with the micro actuation unit cavity;

wherein, when an electrical power is supplied to the electrical resistor layer, the electrical resistor layer generates heat, said generated heat inducing a temperature difference between the upper film and the lower film, thereby causing thermo-buckled deformation of the upper film and the lower film, and thereby forcing the liquid to flow from the source liquid section through the flow channel to the target liquid section in the direction laterally between the lower film and substrate.

4. The thermo-buckled micro-pump device as claimed in claim 3, wherein a buffering layer is arranged between the lower film and the substrate, said buffering layer serving to enhance attachment between the lower film and the substrate.

5. The thermo-buckled micro-pump device as claimed in claim 3, wherein the upper film and the lower film are made of parylene having high thermal expansion coefficient.

6. A thermo-buckled micro-pump device for delivering liquid from a source liquid section to a target liquid section, the thermo-buckled micro-pump device comprising:

a substrate;

a lower film formed on said substrate and made of a material of high thermal expansion coefficient, said lower film having a first thickness, the lower film extending over the substrate to enclose a micro actuation unit cavity therebeneath, wherein the micro actuation unit cavity has a cavity entrance for connecting to the source liquid section and a cavity exit for connecting to the target liquid section, wherein said cavity entrance is connected to the source liquid section through a first diverging structure having a respective width increased from the source liquid section to the cavity entrance, and wherein the cavity exit is connected to the target liquid section through a second diverging structure having a respective width increased from the cavity exit to the target liquid section, thereby maintaining a flow of said liquid from said source liquid section to said target liquid section through the micro actuation unit cavity in a direction laterally between the lower film and substrate;

an upper film made of a material of high thermal expansion coefficient, said upper film being arranged on the lower film and having a second thickness, the second thickness being different from the first thickness; and an electrical resistor layer of a predetermined configuration formed between the lower film and the upper film, said electrical resistor layer being located above and in correspondence with the micro actuation unit cavity;

wherein, when an electrical power is supplied to the electrical resistor layer, the electrical resistor layer generates heat, which induces a temperature difference between the upper film and the lower film and thus causing thermo-buckled deformation of the upper film and the lower film, and thereby forcing the liquid to flow from the source liquid section to the target liquid section in the direction laterally between the lower film and substrate.

7. The thermo-buckled micro-pump device as claimed in claim 6, wherein a buffering layer is arranged between the lower film and the substrate, said buffering layer serving to enhance attachment between the lower film and the substrate.

8. The thermo-buckled micro-pump device as claimed in claim 6, wherein the upper film and the lower film are made of parylene having high thermal expansion coefficient.

9. The thermo-buckled micro actuation unit as claimed in claim 1, wherein said predetermined configuration of said electrical resistor layer includes a winding shape.

10. The thermo-buckled micro actuation unit as claimed in claim 1, wherein said predetermined configuration of said electrical resistor layer includes a spiral shape.

11. The thermo-buckled micro actuation unit as claimed in claim 3, wherein said predetermined configuration of said electrical resistor layer includes a winding shape.

12. The thermo-buckled micro actuation unit as claimed in claim 3, wherein said predetermined configuration of said electrical resistor layer includes a spiral shape.

13. The thermo-buckled micro actuation unit as claimed in claim 6, wherein said predetermined configuration of said electrical resistor layer includes a winding shape.

14. The thermo-buckled micro actuation unit as claimed in claim 6, wherein said predetermined configuration of said electrical resistor layer includes a spiral shape.

* * * * *